UNITED STATES PATENT OFFICE.

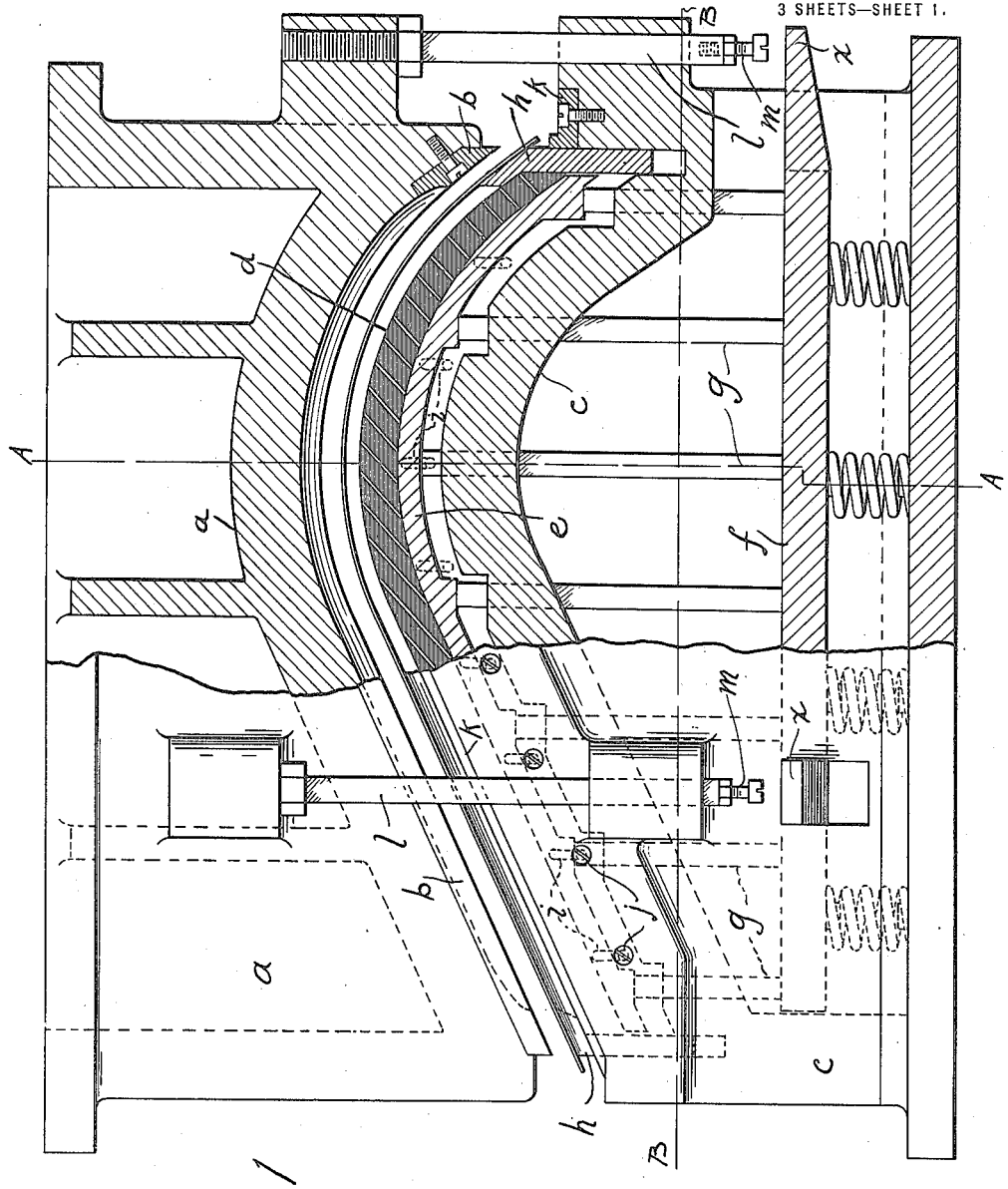

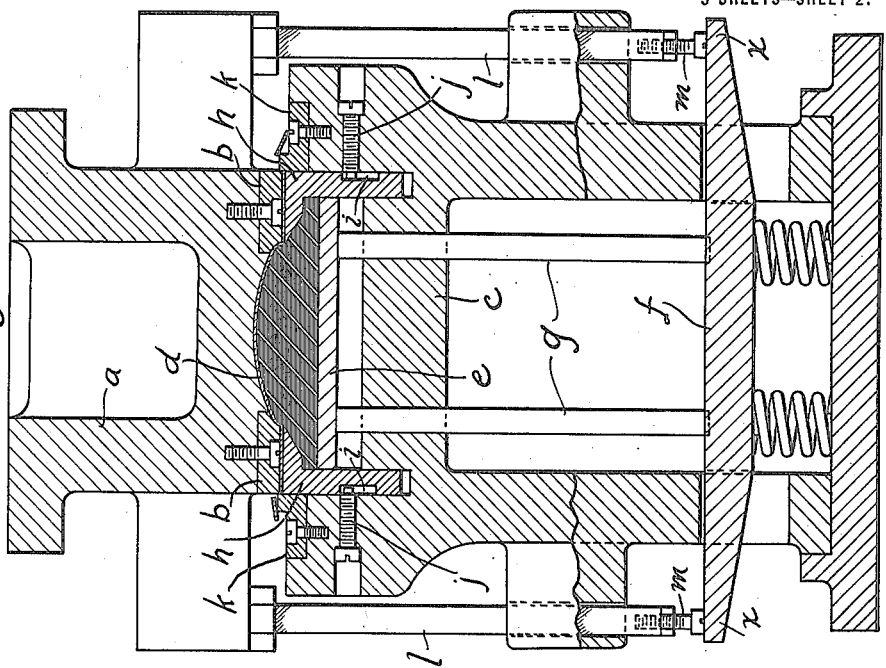
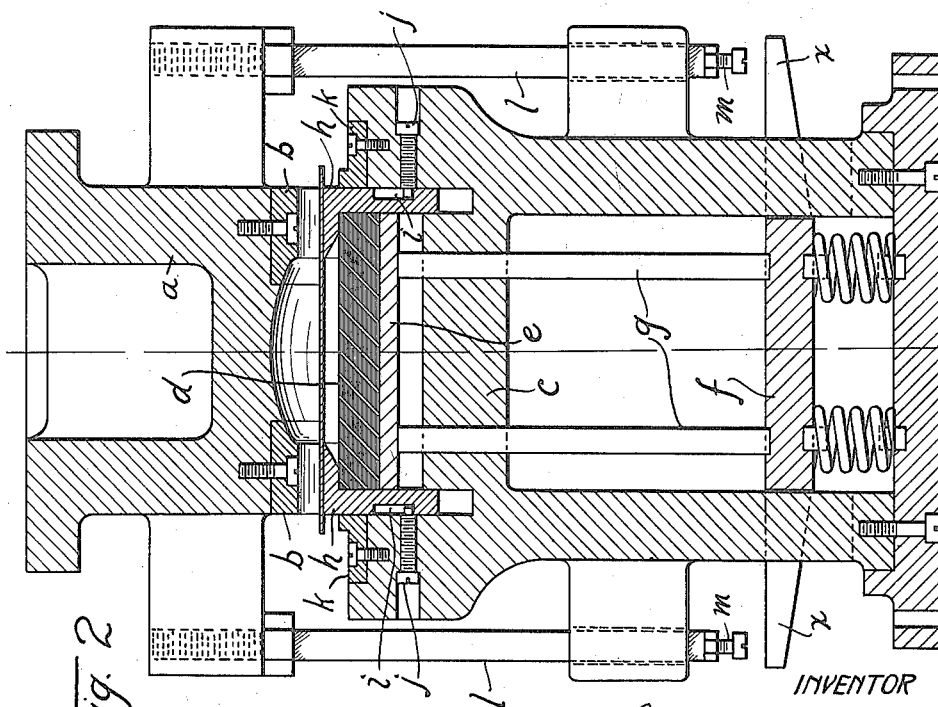

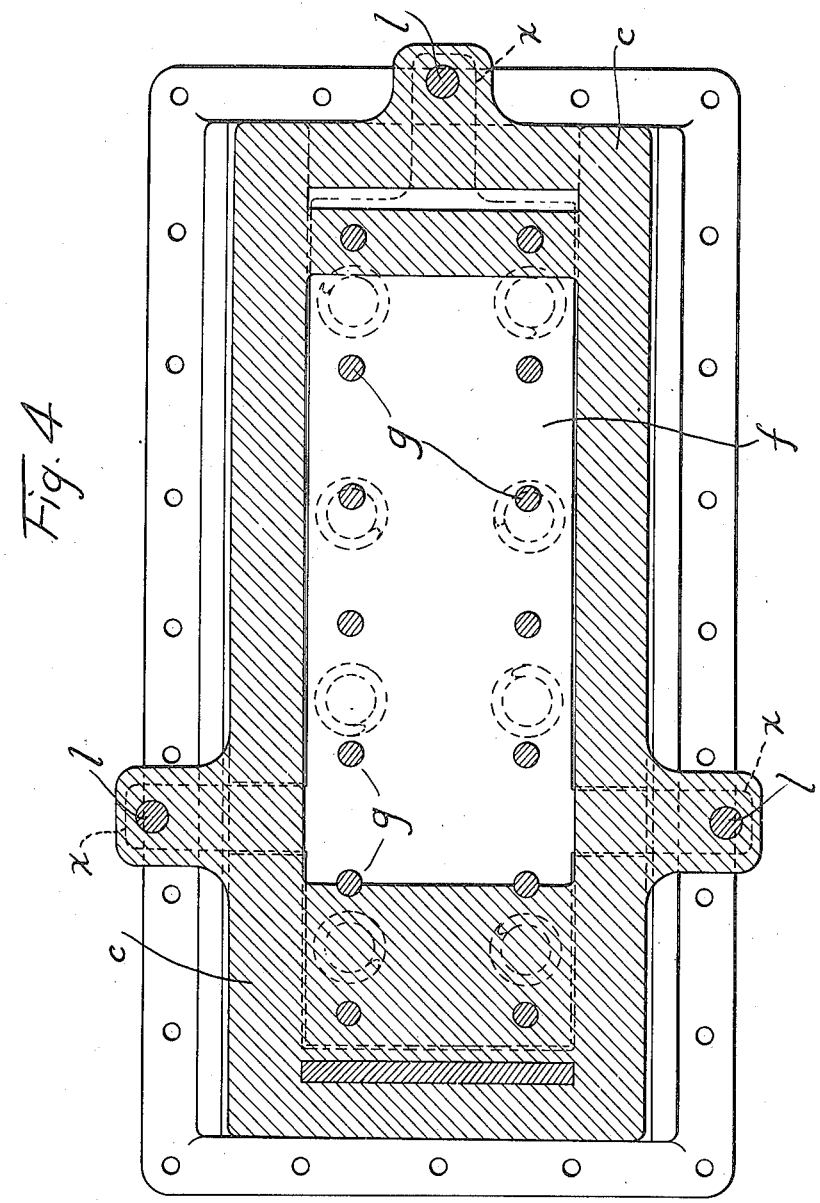

CONRAD REHBEIN, OF DETROIT, MICHIGAN, ASSIGNOR TO HAYES MANUFACTURING COMPANY, OF DETROIT, MICHIGAN, A CORPORATION OF MICHIGAN.

PRESS.

1,207,326.

Specification of Letters Patent.

Patented Dec. 5, 1916.

Application filed April 29, 1916. Serial No. 94,448.

*To all whom it may concern:*

Be it known that I, CONRAD REHBEIN, a citizen of the United States, residing at Detroit, county of Wayne, State of Michigan, have invented a certain new and useful Improvement in Presses, and declare the following to be a full, clear, and exact description of the same, such as will enable others skilled in the art to which it pertains to make and use the same, reference being had to the accompanying drawings, which form a part of this specification.

This invention relates to a press adapted to both crown and shear automobile fenders.

The invention broadly comprises apparatus for forming and trimming sheet metal. The forming is done by a distortable element, such as rubber, and suitable devices are provided to afford, in connection with the forming pad, apparatus for shearing the edges of the fenders so that both the forming and trimming of the fenders can be done by a single press operation.

In the drawings,—Figure 1 is a side elevation of the press partly in longitudinal section. Figs. 2 and 3 are cross sections on the line A—A of Fig. 1, showing the press before and after the ram descends. Fig. 4 is a horizontal section on the line B—B of Fig. 1.

The ram or punch is designated a. This carries a female die, which is here shown in the form of a pair of strips b, b screwed to the bottom of the ram which is itself concaved to form with the strips the crown shaping cavity for the fender.

The bolster of the press is a composite structure made up of the stationary bed c, a rubber pad d, a vertically slidable rubber pad support e, a yieldable platform f, and the vertically guided pins g which space the rubber pad support and the yieldable platform. Along the sides and ends of the rubber pad is an angle metal draw ring h provided with vertical slots i in its side into which project the ends of the screws j to guide the draw ring in its vertical movements and to limit its upward movement.

The strips b are made of tool steel and the outside edges in connection with the tool steel strips k attached to the bolster serve to shear the edges of the fenders. The ram is provided with three depending rods l having adjusting screws m on their lower ends for the purpose of striking the yielding platform f at a determined time.

In operation the ram or punch descends from the position shown in Fig. 2, pinching the sheet of metal between the strips b and the draw ring h preparatory to making the draw. Further descent of the punch serves to press the draw ring down into the rubber pad, distorting the pad and causing the rubber to flow toward the center, and press the sheet of metal into the concavity of the punch, forming the crown in the fender as shown in Fig. 3, (the showing in this figure, however, is slightly later in the operation). The punch continues to descend, and the adjusting screws m strike the projecting ears x on the yieldable platform f, thereby relieving the pressure of the spacing pins g on the pad carrier e, and hence as the draw ring is carried farther down, the pressure on the rubber pad is not increased materially. The draw ring may now be pressed down so that the lower outside edge of the tool steel strip b passes the upper inside edge of the tool steel strips k in the manner shown in Fig. 3, shearing the edges of the fender as indicated in this figure.

The draw ring not only serves to protect the edges of the rubber pad from wear and contact with the sharp cutting edges of the tool steel strips but it also serves its normal function of gripping the metal preparatory to the draw. It is to be noted that this draw ring does not operate in the customary way of draw rings, which is to have a separate gripping member which is first put into engagement with the sheet metal and then a separately and independently operated punch descends for operation after the draw ring has gripped the metal.

From the above operation it will be seen that fenders or other sheet metal parts may be quickly and reliably stamped and sheared in a single operation of the press above described.

What I claim is:

1. In a press, the combination of a bolster provided with a cutting strip, forming means included within the figure formed by the cutting strip, and a punch provided with a cutting strip, said punch serving to first grip the metal inclosed within the cutting strip, then cause the forming means to emboss the metal, and upon further descent arranged to shear the metal.

2. In a press, the combination of a punch provided with a cutting strip along the outer edge thereof and having a forming concavity, a bolster having a cutting strip along the opening into which the punch descends, and a distortable pad located in said opening.

3. In a press, the combination of a punch provided with a shaping concavity, a bolster, a distortable pad carried by the bolster, and a draw ring capable of vertical reciprocation in the bolster and engaging over the edge of the pad.

4. In a press, the combination of a punch provided with a shaping concavity, a bolster, a distortable pad supported by the bolster, and a metal draw ring about and over the edge of the distortable pad.

5. In a press, the combination of a punch provided with a shaping concavity, a bolster, a distortable pad carried by the bolster, and a draw ring guided in the bolster for vertical reciprocation and having an ell cross section.

6. In a press, the combination of a punch provided with a shaping concavity, a bolster, a distortable pad carried by the bolster, a vertically reciprocable draw ring about the edge of the pad, a cutting strip carried by the punch, and a cutting strip carried by the bolster, the two cutting strips serving to shear the edges of the sheet metal upon further descent of the punch after the forming of the sheet metal.

7. In a press, the combination of a punch provided with a shaping concavity, a bolster, a distortable pad carried thereby, a cutting strip secured to the punch and a cutting strip secured to the bolster, the said cutting strips serving to shear the edges of the metal upon further descent of the punch after the punch has distorted the pad to form the sheet metal.

8. In a press, the combination of a punch, a bolster, forming means carried thereby and operated by the descent of the punch, shearing devices on both the punch and bolster, and yieldable means to relieve the pressure on the forming means after the punch has operated the same and when the punch descends further to shear the edges of the sheet metal.

9. In a press, the combination of a punch provided with a shaping concavity, a bolster, a distortable pad carried by the bolster, shearing devices carried on both the punch and the bolster, and yieldable means for supporting the distortable pad and arranged to relieve the pressure upon the pad when the punch after the forming operation descends further to shear the edges of the sheet metal.

10. In a press, the combination of a punch provided with a shaping concavity, a bolster, a distortable pad, shearing devices on the punch and bolster, a pad carrier, a yieldable platform, spacers between the platform and the pad support, and means on the punch for striking the yieldable platform to relieve the pressure on the distortable pad when the punch descends to shear the edges of the sheet metal after the pad has been distorted for forming.

11. In a press, the combination of a punch provided with a shaping concavity, a bolster provided with a yieldable platform, a distortable pad on the bolster, shearing devices on the punch and bolster, a pad support slidable vertically in the bolster, spacers between the pad support and the platform, and adjustably extensible rods depending from the punch for striking the platform at a predetermined point to relieve the pressure upon the pad when the punch has descended a given distance and descends further to shear the edges of the sheet metal.

In testimony whereof, I sign this specification.

CONRAD REHBEIN.